Jan. 18, 1944. G. P. BOSOMWORTH ET AL 2,339,553
VULCANIZER
Filed Nov. 18, 1941 4 Sheets-Sheet 1

Inventor
George P. Bosomworth
and
Edward S. Heck
By Ely & Frye
Attorneys

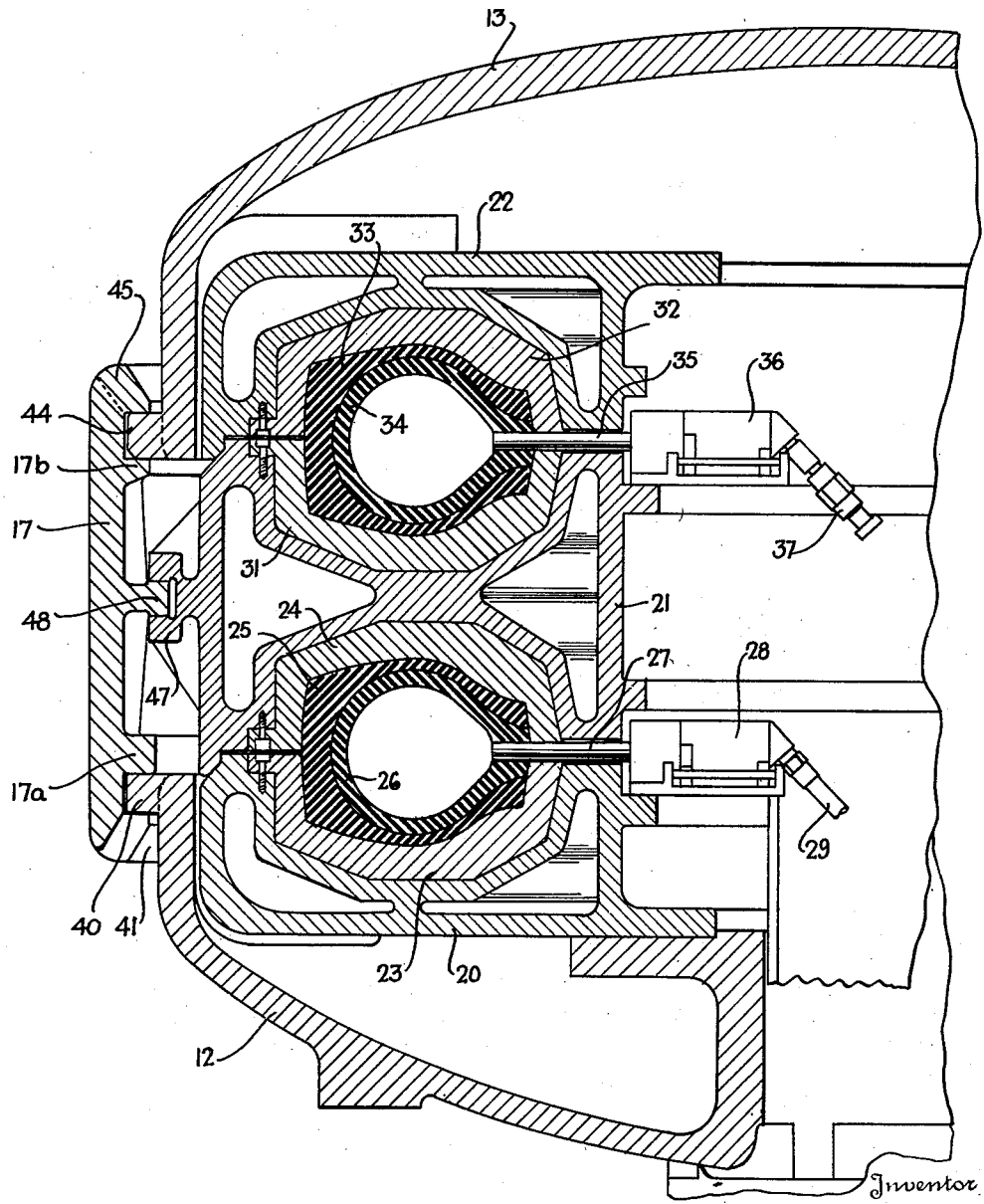

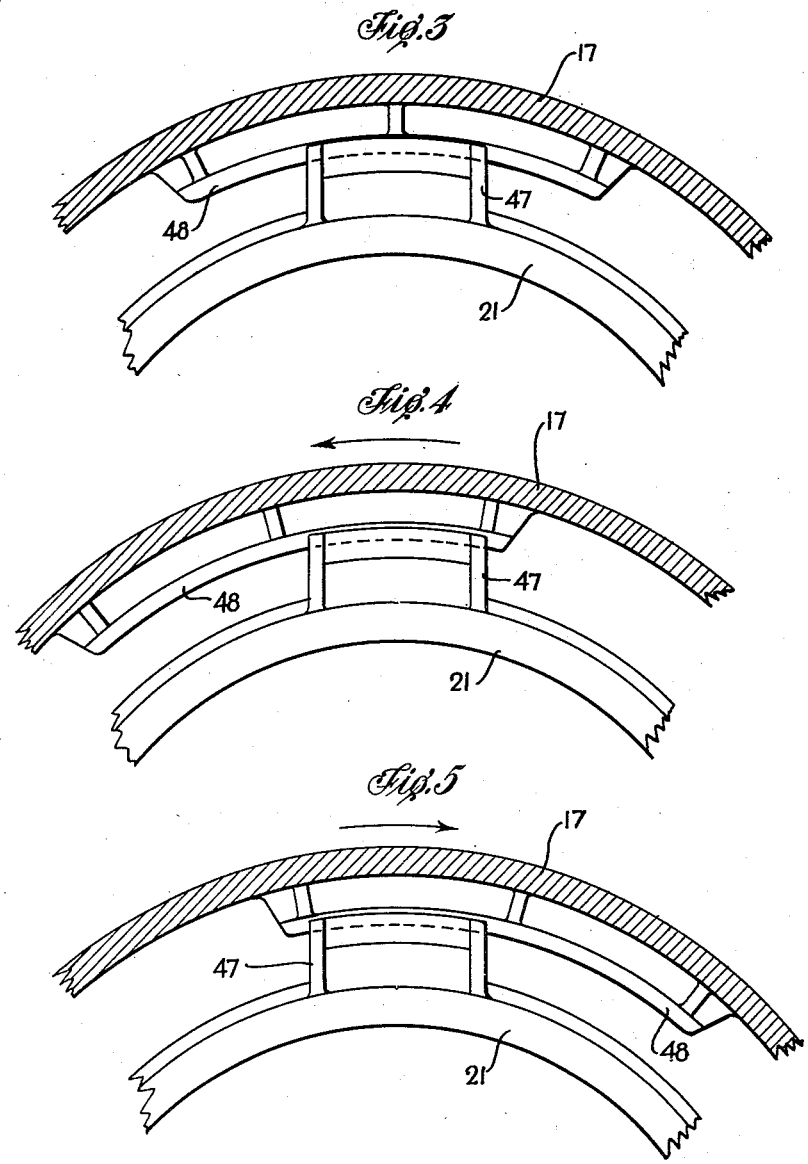

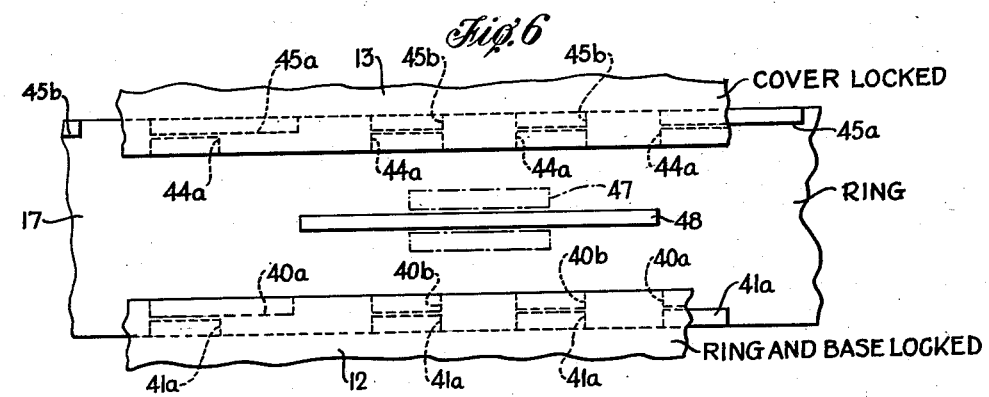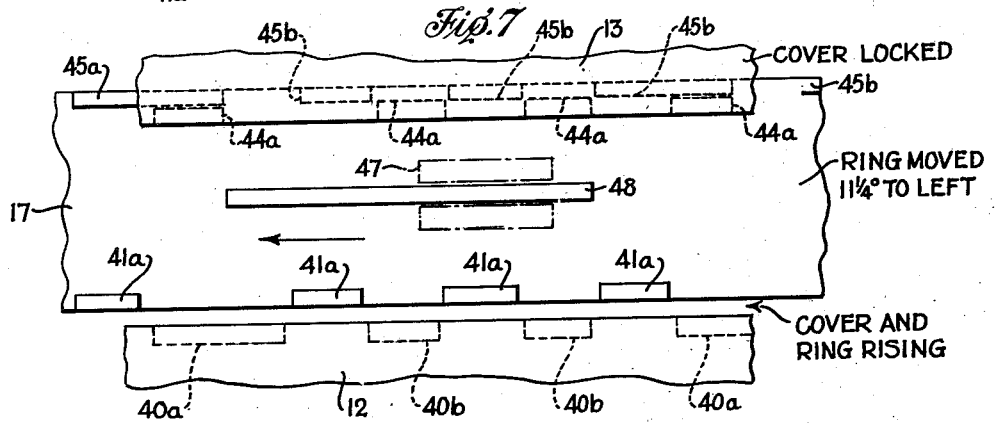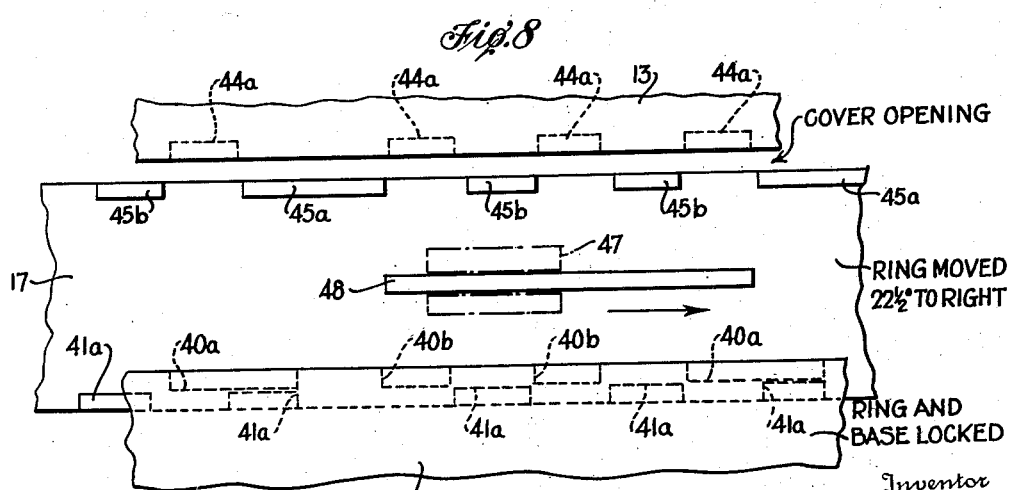

Patented Jan. 18, 1944

2,339,553

UNITED STATES PATENT OFFICE 2,339,553

VULCANIZER

George P. Bosomworth and Edward S. Heck, Akron, Ohio, assignors to The Firestone Tire & Rubber Company, Akron, Ohio, a corporation of Ohio Application November 18, 1941, Serial No. 419,592

5 Claims. (Cl. 18—17)

This invention relates to vulcanizers of the watch case type that are arranged in horizontal position, and more especially it relates to dual vulcanizers of the type that comprise a pair of vulcanizing molds adapted for the concurrent vulcanization of articles therein.

The vulcanizer is of especial utility in the manufacture of pneumatic tire casing and inner tubes for such casings, and its use results in substantial savings in the cost of original equipment; the output of vulcanizers is increased; and economy of floor space is achieved.

The invention is an improvement upon our copending application for Letters Patent on Vulcanizing press, Serial No. 384,326, filed March 20, 1941, now Patent No. 2,290,603, which press comprises a pair of vulcanizer sections, a locking ring for retaining the sections in closed condition, a pair of vulcanizing molds within the press, a pair of locking rings for said molds, and means controlled by the vulcanizer locking ring for moving one of the mold-locking rings to mold locking position while concurrently moving the other mold locking ring to unlocked position.

The chief object of the invention is to improve upon the construction of the vulcanizing press constituting the subject matter of our aforementioned application for Letters Patent without sacrificing any of the advantageous features thereof. More specifically the invention aims to provide a dual vulcanizer of the character mentioned therein, but a single locking ring is provided for locking and unlocking the vulcanizer and for selectively locking and unlocking the respective molds therein. Other objects contemplated are the simplification of construction and the conservation of material. Other objects will be manifest as the description proceeds.

Of the accompanying drawings:

Figure 2 is a fragmentary vertical section of the vulcanizer, and the work therein, on a larger scale, the locking ring being in position to enable the lower mold to open upon the opening of the vulcanizer;

Figure 3 is a fragmentary plan view of interlocking means on the locking ring and the intermediate mold section of the apparatus, in the relative positions that obtain during a vulcanizing operation;

Figure 4 is a view of the parts shown in Figure 3 in the relative positions they assume during the opening of the lower mold;

Figure 5 is a view of the parts shown in Figs. 3 and 4 in the relative positions they assume during the opening of the upper mold;

Figure 6 is a somewhat diagrammatic fragmentary elevation showing the angular position of the locking ring and locking elements thereof with relation to the cooperating elements of the vulcanizer base and vulcanizer cover, as viewed from the interior of the vulcanizer, during a vulcanizing operation as in Figure 3;

Figure 7 is a view similar to Figure 6 showing the relative position of the interlocking elements during the opening of the lower mold as in Figure 4; and Figure 8 is a view similar to Figs. 6 and 7 showing the relative position of the interlocking elements during the opening of the upper mold, as in Fig. 5.

Figure 1:
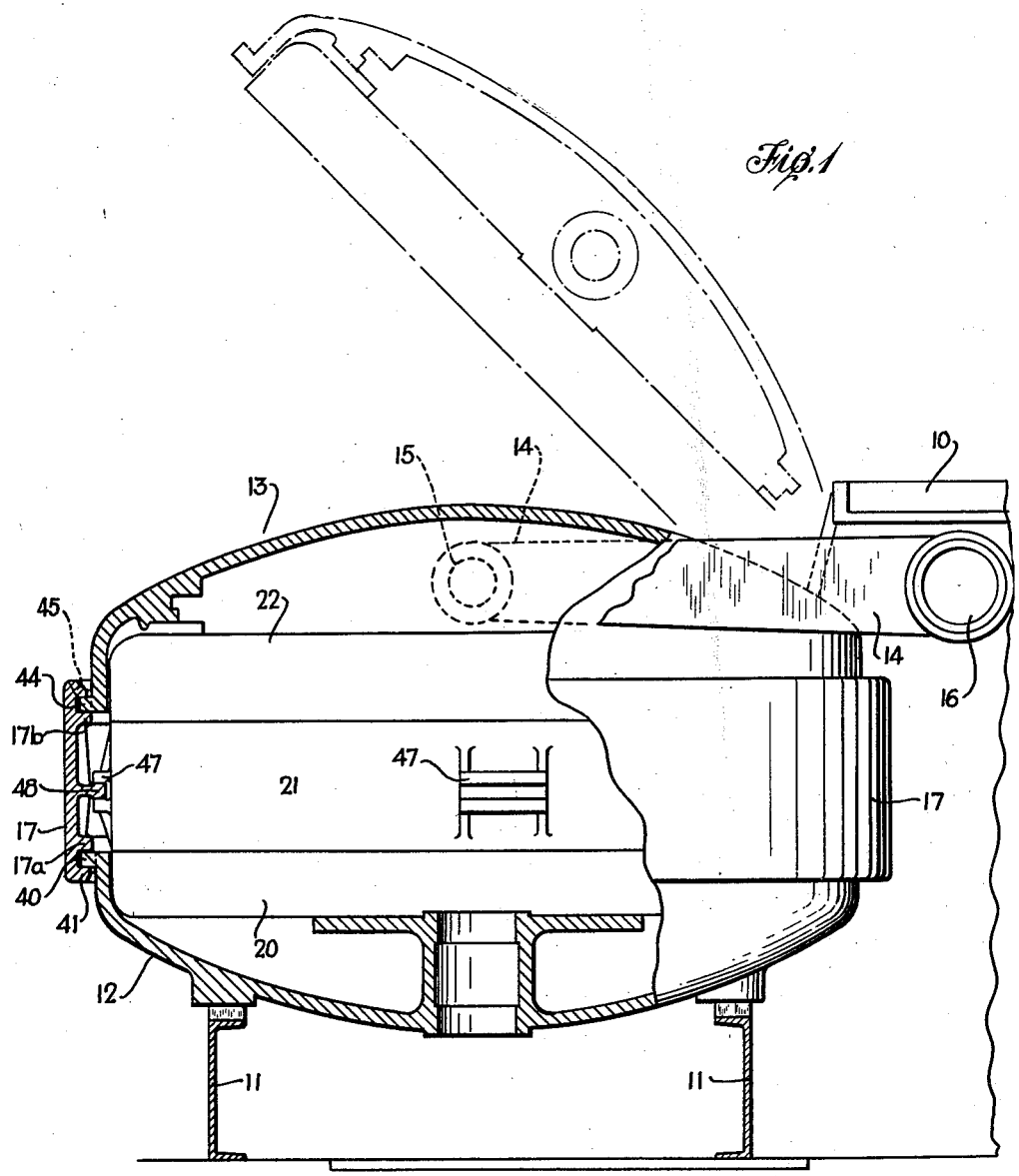
Figure 1 is a side elevation of a dual vulcanizer embodying the invention, a part thereof being broken away to reveal a pair of molds therein in elevation, the locking ring thereof being shown in the position in which it is disposed during a vulcanizing operation.

Referring to Fig. 1 of the drawings, there is shown somewhat diagrammatically, a vulcanizer embodying the invention, said vulcanizer comprising a housing 10 that includes a stationary support 11, a stationary lower vulcanizer section 12 mounted upon said support 11, a movable upper vulcanizer section or cover 13, and a pair of arms 14, 14 for raising and lowering the cover 13 between the position shown in full lines and the position shown in broken lines in said figure. The arms 14 are pivotally connected to the cover 13 at diametrically opposite points 15 and are pivotally supported on the housing 10 at 16, there being power-operated means (not shown) for swinging the said arms in the usual manner. The vulcanizer sections 12, 13 are of concavo-convex shape and have their concave sides in confronting relation so as to define a chamber for vulcanizing molds. The confronting margins or edges of the sections 12, 13 do not meet in the closed condition of the vulcanizer, but are considerably spaced apart as shown, and an annular locking ring 17 is provided for spanning the space between the sections, and for locking the same to each other in the closed position of the vulcanizer. The details of said locking ring and its manner of connection with the respective vulcanizer sections presently will be described.

Mounted interiorly of the vulcanizer is a pair of horizontally arranged molds comprising a lower mold section 20, an intermediate mold section 21, and an upper mold section 22, the latter being secured to the vulcanizer cover 13. The lower mold section 20 may be fixedly attached to the stationary vulcanizer section 12, but if desired, means (not shown) may be employed for urging the mold sections toward each other, relatively of the vulcanizer sections, as is common practice in vulcanizers of this general type. As shown in Fig. 2, the upwardly presented side of the lower mold section is formed with a recess in which is removably mounted a molding insert 23, and the downwardly presented side of the intermediate mold section 21 is similarly formed with a recess in which is removably mounted a molding insert 24. When the mold sections 20, 21 are in mating relation, the inserts 23, 24 define a molding cavity, which as herein shown is arranged to receive a pneumatic tire casing 25. The latter is shown with the usual expansible core 26 therein, which core is heated and distended by means of hot fluid under pressure that is admitted thereto through the agency of its inflation stem 27, whereby the tire is subjected to heat and internal pressure during vulcanization. The stem 27 extends through the inner circumferential wall of the mold and has its end portion engaged with an automatic coupling 28 mounted thereat, said coupling having connection, by means of the pipe 29, with a source of heated fluid under pressure (not shown).

In like manner the upwardly presented side of the intermediate mold section 21 is formed with a recess for receiving a molding insert 31, and the downwardly presented side of the upper mold section 22 is recessed to receive a molding insert 32 that mates with the insert 31 to define a molding cavity for a second pneumatic tire casing 33. The latter may be identical with the tire casing 25 in the lower mold, or it may differ therefrom if desired. The usual expansible core 34 is mounted in the tire casing 33 during a vulcanizing operation, the inflating stem 35 of said core having engagement with a coupling 36 by means of which heated fluid is delivered to the core from the supply pipe 37. The mold sections 20, 21, and 22 are steam jacketed, and steam is circulated therethrough in the usual manner for supplying heat exteriorly to the tires 25 and 33 to effect vulcanization thereof.

The mold sections 20, 21 and 22 are closed when the vulcanizer is closed, that is, when the cover 13 is in lowered position, the locking ring 17 being employed to maintain the molds and vulcanizer closed against the expansive force of the cores 26 and 34. In the opening of the vulcanizer and molds to remove the finished work therefrom, the upper mold section 22 is lifted from the intermediate mold section 21 to enable the removal of tire 33 from the upper mold. To remove the tire 25 from the lower mold, upper mold section 22 and intermediate mold section 21 are lifted as a unit from lower mold section 20 to expose the tire in the latter. In the latter instance the locking ring 17 is arranged to rise with the cover 13, and means is provided for effecting an interlocking of the locking ring and intermediate mold section whereby the latter rises with the upper mold section. When the upper mold is opened and the locking ring is not elevated, but remains in the position in which it locks the intermediate section to lower vulcanizer section, thus maintaining the lower mold in closed condition. The locking and unlocking of the vulcanizer sections and mold sections is achieved by imparting limited rotary movement to the locking ring 17, both in clockwise and counterclockwise direction, and the usual means (not shown) is provided for imparting such rotary movement to the locking ring. In the closed position of the vulcanizer the locking ring rests upon the lower vulcanizer section 12, and to this end the locking ring is formed, adjacent its lower margin, with an inwardly extending circumferential flange 17a adapted to overlie a circumferential series of locking lugs formed at the upper margin of the vulcanizer section 12 and projecting radially outwardly therefrom, said lugs being designated as a whole by the numeral 40. For cooperation with the lugs 40 to effect a bayonet locking connection between the lower vulcanizer section and the locking ring, the lower margin of the latter is formed with a circumferential series of inwardly projecting lugs that are designated as a whole by the numeral 41. The specific shape, size, and arrangement of the locking lugs 40 and 41 presently will be described.

In like manner the locking ring 17 is formed adjacent its upper margin with an inwardly extending circumferential flange 17b that may constitute a rest for the cover 13 of the vulcanizer in the lowered condition of the cover, the latter having its lower margin formed with a circumferential series of radially outwardly projecting locking lugs, designated as a whole by the numeral 44, that may rest on said flange 17b, as shown in Figs. 1 and 2. For cooperation with the lugs 44 to effect a bayonet locking connection between the cover 13 and the locking ring 17, the upper margin of the latter is formed with a circumferential series of inwardly projecting lugs that are designated as a whole by the numeral 45. The size, shape, and arrangement of the locking lugs 44 and 45 presently will be described.

For effecting an interlock of the locking ring 17 and the intermediate mold section 21, the latter has its perimeter formed with a circumferential series of longitudinally slotted, radially outwardly projecting ears 47, 47, and receivable in the slots thereof are respective circumferentially extending ribs or tongues 48 that are formed on the locking ring 17, intermediate the upper and lower margins thereof, and which extend radially inwardly from said locking ring. As is best shown in Figs. 3, 4 and 5, each tongue 48 is slightly more than twice as long as its companion ear 47, and normally is disposed within the slot in said ear at all times. Figure 3 shows the relative positions of the ear 47 and tongue 48 during a vulcanizing operation. Figure 4 shows their relative positions when the locking ring is turned counterclockwise a distance of 11¼° to unlock the vulcanizer section 12 from the locking ring, and Figure 5 shows their relative positions when the locking ring is turned clockwise a distance of 22½ degrees from the position shown in Figure 4 to lock the vulcanizer section 12 to the locking ring and concurrently to unlock the locking ring from the upper vulcanizer section or cover 13. The fragmentary views of Figs. 3 to 5 show but one ear 47 and one tongue 48, but actually the mold section 21 is provided with four ears 47 and the locking ring has the same number of tongues 48, said ears and tongues being symmetrically disposed around the mold section and ring. The length of the ears 47 and tongues is such that the distance between adjacent ears is greater than the length of each tongue, the arrangement being such that the locking ring may, on occasion, be rotated relatively of the intermediate mold section 21 a sufficient distance to move the tongues entirely out of the slots of the ears. But this contingency arises only when it is desired to substitute a different mold for the mold then in the vulcanizer.

The relative size and arrangement of the locking lugs of the respective series 40, 41, 44, and 45 is shown most clearly in Figs. 6 to 8 to which attention now is directed. As shown in said figures, the series of locking lugs 40 on the lower vulcanizer section 12 comprises a plurality of relatively long lugs 40a and twice as many relatively short lugs 40b. All of said lugs are separated by spaces that are slightly greater than the length of the short lugs, the length of the long lugs being slightly more than twice the length of the short lugs. The perimeter of the vulcanizer section 12 may be considered as consisting of four quadrants with one long lug and two short lugs in each quadrant, the lugs being symmetrically disposed to provide two short lugs between two long lugs as shown. The series of locking lugs 41 on the locking ring 17 comprises relatively short lugs 41a similar in length to the lugs 40b. Each quadrant of the locking ring comprises three lugs 41a, the three lugs of any quadrant being spaced from each other a distance slightly greater than the length of each lug, the spaces between the adjacent lugs of contiguous quadrants being slightly greater than the length of lugs 40a of the ring 13.

The series of locking lugs 44 on the cover 13 comprises individual lugs 44a that are of the same length as the lugs 41a previously described, and are arranged in groups of three in each quadrant of the cover in the same manner as said lugs 41a. The series of locking lugs 45 on the locking ring 17 comprises relatively long lugs 45a and relatively short lugs 45b, said lugs being identical with the respective lugs 40a, 40b of the vulcanizer section 12, as previously described, and of the same number and arrangement as the latter. The lugs 40a, 40b and the lugs 44a require to be determinately positioned relatively to each other, and since the vulcanizer section 12 and cover section 13 are not rotatable relatively of each other, it follows that said lugs always maintain the same position, in which position two of the lugs 44a of each quadrant are aligned with the two lugs 40b while the third lug 44a of said quadrant is aligned with one end portion of a lug 40a.

The operation of the apparatus is as follows: During the vulcanizing operation shown in Fig. 2, the vulcanizer sections 12, 13 are locked together by the locking ring 17 to maintain the molds in the vulcanizer in closed condition, while the tires in said molds are vulcanized in the usual manner. The angular position of the locking ring at this time is best illustrated in Fig. 6 wherein it will be seen that lugs 41a of the ring are in registry or alignment with lugs 40a and 40b of the vulcanizer section 12, and lugs 45a and 45b of the ring are in registry with lugs 44a of the cover 13. After vulcanization is completed, the work requires to be removed and to this end the vulcanizer is opened in a manner that lifts intermediate mold section 21 off of mold section 20 to expose tire 25.

To so open the vulcanizer requires the locking ring 17 to be unlocked from the vulcanizer section 12, which operation is effected by moving the locking ring counterclockwise (to the left as viewed in Fig. 7) a distance of 11¼ degrees. Such movement of the locking ring carries the lugs 41a of the ring into alignment with the spaces between lugs 40a, 40b of the vulcanizer section 12, thus enabling subsequent separation of the latter and the ring. Said rotary movement of the locking ring also moves the lugs 45b thereof into registry with spaces between lugs 44a of the cover 13, but does not move lugs 45a out of registry with lugs 44a. Thus when cover 13 is elevated to open the vulcanizer, ring 17 still locked to the cover will rise with it, and also raise intermediate mold section 21 which always is interlocked with the ring 17 through the agency of ears 47 and tongues 48. With the vulcanizer open the tire 25 may be removed and replaced with an unvulcanized tire.

The cover is then lowered to close the vulcanizer, and the locking ring is rotated 22½ degrees in clockwise direction, the relative positioning of the several locking lugs resulting from such movement being best shown in Fig. 8. Thus some of the locking lugs 41a are moved into registry with spaces between lugs 40a and 40b of the vulcanizer section 12, but other lugs 41a are moved into registry with the lugs 40a to lock the ring to said section 12. Concurrently the lugs 45a and 45b are moved into registry with the wide and the narrow spaces respectively between the lugs 44a of the cover 13. The arrangement is such that the cover 13 may be then raised to separate the mold section 22 from mold section 21, the latter and the ring 17 remaining stationary. The tire 33 may then be removed from the upper mold and an unvulcanized tire mounted in place thereof. The cover 13 may then be lowered, after which the ring 17 is rotated 11¼ degrees in counterclockwise direction to lock the vulcanizer and return the interlocking elements thereof to the positions shown in Fig. 6, which completes the cycle of operation.

The invention is simple in its construction and operation, and achieves the several advantages set out in the foregoing statement of objects.

Modification may be resorted to without departing from the spirit of the invention or the scope thereof as defined by the appended claims.

What is claimed is:

1. In apparatus of the character described, the combination of a pair of vulcanizer sections confronting each other and movable toward and away from each other to close and open the said sections, a ring rotatably circumscribing said sections, locking lugs formed on the confronting margins of the respective sections, locking lugs formed on the respective margins of the ring interengageable with the lugs on the sections, said lugs being so constructed and arranged that the ring lugs may be interlocked with lugs of either of the vulcanizer sections while not interlocked with the other and may be interlocked with the lugs of both sections concurrently, upon determinate rotary movement of the ring, work-molding means between the said vulcanizer sections, and means providing sliding interengagement of the locking ring with said work-molding means.

2. In apparatus of the character described, the combination of a pair of vulcanizer sections confronting each other and movable toward and away from each other to close and open the said sections, a locking ring having locking formations thereon engageable with the confronting marginal portions of the two vulcanizer sections to retain the latter in closed position, said locking formations being so constructed and arranged that angular rotary movement of the locking ring through a relatively small arc will disengage the ring selectively from one or the other of said sections to enable opening of the sections, molding elements arranged between said vulcanizer sections, and means providing interengagement of the locking ring and a molding element enabling relative movement thereof when the locking ring is rotated.

3. In apparatus of the character described, the combination of a pair of circular vulcanizer sections movable from and toward each other to open and close the apparatus, the confronting margins of said sections being spaced apart, a circumferential locking ring engageable with the confronting marginal portions of the two vulcanizer sections to retain the latter in closed position, means for selectively disengaging the locking ring from one or the other of the said sections to enable opening of said vulcanizer sections, and a pair of molds within said vulcanizer sections, said molds comprising a mold section fixedly secured to one vulcanizer section, another mold section fixedly secured to the other vulcanizer section, a third mold section intermediate the aforementioned mold sections, and means on the locking ring extending between the confronting margins of the vulcanizer sections and having constant sliding connection with said intermediate mold section such as to enable rotary movement of the ring without imparting similar movement to the mold section.

4. A combination as defined in claim 3 in which the last mentioned means comprises a plurality of longitudinally slotted radially projecting ears on the perimeter of the intermediate mold section, and tongues projecting inwardly from the locking ring slidably received in the slots in the respective ears.

5. In a vulcanizer of the character described, the combination of a pair of vulcanizer sections confronting each other and movable from and toward each other to open and close the vulcanizer, a rotatable ring circumscribing said sections, locking lugs formed on the confronting margins of the respective sections, and locking lugs formed on the respective margins of the ring engageable with the lugs on said sections, said lugs being so constructed and arranged that the ring-lugs interlock with the lugs of both vulcanizer sections in one angular position of the ring, they interlock with the lugs on one vulcanizer section and disengage the lugs on the other section when the ring is rotated a determinate distance in one direction, and interlock with the lugs on the last mentioned vulcanizer section and disengage from the lugs of the other vulcanizer section when the ring is rotated a determinate distance in the opposite direction.

GEORGE P. BOSOMWORTH.
EDWARD S. HECK.